(12) United States Patent
Ito et al.

(10) Patent No.: US 8,265,131 B2
(45) Date of Patent: Sep. 11, 2012

(54) CONTROL APPARATUS FOR AND CONTROL METHOD OF EQUALIZER, AND WIRELESS TERMINAL HAVING THAT CONTROL APPARATUS

(75) Inventors: Akira Ito, Kawasaki (JP); Tsuyoshi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 273 days.

(21) Appl. No.: 12/574,954

(22) Filed: Oct. 7, 2009

(65) Prior Publication Data
US 2010/0020855 A1    Jan. 28, 2010

Related U.S. Application Data

(63) Continuation of application No. PCT/JP2007/058658, filed on Apr. 20, 2007.

(51) Int. Cl.
H03H 7/30 (2006.01)
(52) U.S. Cl. ....................................................... 375/229
(58) Field of Classification Search .................. 375/229, 375/230, 231, 232, 233, 234
See application file for complete search history.

(56) References Cited

U.S. PATENT DOCUMENTS

| | | | |
|---|---|---|---|
| 6,560,272 B1 | 5/2003 | Komatsu | |
| 2001/0033614 A1* | 10/2001 | Hudson | 375/229 |
| 2003/0043887 A1* | 3/2003 | Hudson | 375/144 |
| 2003/0086482 A1 | 5/2003 | Shimizu et al. | |
| 2005/0058183 A1* | 3/2005 | Ogawa et al. | 375/148 |
| 2005/0152486 A1 | 7/2005 | Wang | |
| 2005/0276315 A1 | 12/2005 | Shimizu et al. | |
| 2006/0013326 A1* | 1/2006 | Yoshida | 375/260 |
| 2006/0039460 A1* | 2/2006 | Fimoff et al. | 375/233 |
| 2006/0209974 A1* | 9/2006 | Yoshida | 375/260 |
| 2007/0291827 A1 | 12/2007 | Hasegawa et al. | |

FOREIGN PATENT DOCUMENTS

| | | |
|---|---|---|
| EP | 1 548 953 | 6/2005 |
| EP | 1 617 611 | 1/2006 |
| EP | 1 850 494 | 10/2007 |
| JP | 2000-49662 | 2/2000 |
| JP | 2002-280943 | 9/2002 |
| JP | 2003-133999 | 5/2003 |
| JP | 2004-104575 | 4/2004 |
| JP | 2005-94134 | 4/2005 |
| JP | 2005-354263 | 12/2005 |
| JP | 2005-354459 | 12/2005 |
| JP | 2006-54840 | 2/2006 |
| JP | 2006-094215 | 4/2006 |
| WO | 2004/025860 | 3/2004 |
| WO | 2006/087808 | 8/2006 |

OTHER PUBLICATIONS

Extended European Search Report including the Supplementary European Search Report with Annex and the European Search Opinion, issued by the European Patent Office for corresponding European Patent Application No. 07742093.3, dated May 2, 2011.

(Continued)

*Primary Examiner* — Jaison Joseph
(74) *Attorney, Agent, or Firm* — Myers Wolin, LLC.

(57) ABSTRACT

A channel estimation value of each path timing is determined, a path timing, the channel estimation value of which is to be set to zero, is determined based on a reception power of each path timing and a predetermined power threshold (P0), and a channel estimation value of the detected path timing to zero.

12 Claims, 15 Drawing Sheets

OTHER PUBLICATIONS

Anja Klein; Siemens AG; "Data Detection Algorithms Specially Designed for the Downlink of CDMA Mobile Radio Systems"; IEEE VTC'97, Phoenix AZ; pp. 203-207; Dated May 1997; [URL: Downloaded on Sep. 14, 2009 from IEEE Xplore].

Nokia; "HSDPA Improvements for UE categories 7 and 8"; Agenda Item; 6.2.2; Document for Discussion; R4-040680; TSG RAN WG4 meeting #33, Yokohama, Japan, Nov. 15-19, 2004.

Tsuyoshi Hasegawa et al.; "A Study on Sign Bit Chip Correlation MMSE Receiver with MICT" Fujitsu Laboratories Ltd., The Institute of Electronics, Information and Communication Engineers, B-5-8; Dated: 2006; Full English Translation attached.

International Search Report for corresponding International Application No. PCT/JP2007/058658, with a mailing date of Jun. 19, 2007; English Translation.

Japanese Patent Office "Notice of Reasons for Rejection" issued for corresponding Japanese Patent Application No. 2009-512813, issued Mar. 3, 2011. English translation attached.

* cited by examiner

CONTROL APPARATUS FOR AND CONTROL METHOD OF EQUALIZER, AND WIRELESS TERMINAL HAVING THAT CONTROL APPARATUS

CROSS-REFERENCE TO RELATED APPLICATION

This application is a continuation Application of a PCT international application No. PCT/JP2007/58658 filed on Apr. 20, 2007 in Japan, the entire contents of which are incorporated by reference.

FIELD

The embodiments discussed herein are related to a control apparatus for and a control method of an equalizer and a wireless terminal having such a control apparatus.

BACKGROUND

The W-CDMA scheme may experience multipath interferences due to higher chip rates. Techniques for reducing such multipath interferences include equalizers such as FIR filters (see Non-Patent Documents 1 and 2 that will be described later, for example), and the CCMRM (chip correlation minimum mean square error (MMSE) receiver with multi-path interference correlative timing (MICT)) (see Non-Patent Document 3 that will be described later, for example).

These techniques determine weighted-combined coefficients (tap coefficients) such that interference components are effectively canceled using the correlation between paths and such that the signal component is maximized. In order to eliminate the interferences, reception data in the vicinity of the signal (path) timing within an uniform-interval timing of one chip is used.

For example, an equalizer (FIR filter) is configured to include n delay circuits (where n is an integer equal to or greater than 2) that delay reception data incrementally by an unit time (one chip), and n tap multipliers that multiply the outputs from the delay circuits by tap coefficients $w_1$, $w_2, \ldots, w_n$ (hereinafter, also referred to as w), and an addition circuit that adds (determines the total sum of) the outputs from the tap multipliers. The reception data is delayed at each of the delay circuits, thereby forming n data series including non-delayed reception data, and the data series are multiplied with tap coefficients w, which are added (summed) at the addition circuit.

The above-described tap coefficients w are determined by resolving simultaneous linear equation Eq. (1.1) using the correlation matrix R (having i rows by j columns) representing the correlation between paths and channel estimation values h.

$$\sum_j R_{i,j} w_j = h_i \qquad (1.1)$$

In addition, in the CCMRM, when determining the correlation matrix R, the average of the product of signals d prior to despreading (one of signals $d_{i+k}$, $d_{j+k}$ the path timing of which are shifted each other by (i−j) samples is multiplied as a conjugate complex number to the other of $d_{i+k}$, $d_{j+k}$, as expressed by the following Eq. (1.2). Note that in Eq. (1.2), the symbol "*" represents a conjugate complex number and k represents the path number.

$$R_{i,j} = \sum_k d^*_{i+k} \cdot d_{j+k} \qquad (1.2)$$

The above Eq. (1.2) can be expressed in the following Eq. (1.3) using the channel estimation values h and the noise estimation value n in an equalizer:

$$R_{i,j} = \sum_k (h^*_{i+k} \cdot h_{j+k} + n^2 \delta_{i,j}) \qquad (1.3)$$

where $\delta_{i,j}$ represents the Kronecker delta.

Here, the channel estimation values h and the correlation matrix R for the predetermined window width (the number of tap coefficients) is to be determined, and this window width includes timing other than the targeted signal (path) (desired signal) timing in order to eliminate the multipath interference. In addition, the channel estimation values h can be determined by despreading the common pilot signal.

Note that other conventional techniques for reducing multipath interferences include the techniques described in the Patent Documents 1 to 4 listed below.

The technique in Patent Document 1 relates to a spectrum spread RAKE receiver, in which the path timing of a multipath is detected, the path timing is set as the despreading timing. For the delay time between arbitrary two paths, centering around one of the path timings, two timings of the other path timing and the target location are set as the despreading timings for all of the combinations of any two paths. For each timing that is set, a despreading signal for a reception signal is determined and each of the despreading signals is combined.

The technique in Patent Document 2 is a technique for eliminating interferences from an adjacent base station. The interference reduction timing $\tau \pm (\tau_2 - \tau_1)$ for eliminating the interference component incoming from the adjacent base station is determined as well as determining the path timing $\tau$ of a multipath from a base station with which communication is carried out. The interference component is reduced by despreading the received spectrum-spread signal by setting these timings as despreading timings $\tau$, $\tau \pm (\tau_2 - \tau_1)$ and weighting-combining the despreading results.

The technique in Patent Document 3 achieves a RAKE receiver having the MIXR (Multipath Interference exchange Reduction) function in a realistic hardware scale even numeral paths are detected. Among path timings detected by a path search and the MICT generated from the path timings, timings are selected in number that is equal to the number of fingers, which is provided to the fingers. Upon selecting the timings, an expected value of the SNIR after the RAKE synthesis is calculated, and the path timings and the MICT are selected such that that value is maximized.

The technique in Patent Document 4 relates to a RAKE receiver that can effectively reduce the interference noise even if the number of paths is increased. Upon reception of direct spectrum-spread signals of N paths, the reception timing $t_i$ (where i=1 to N) of each of the N paths is detected. The reception signal is despreaded by using, as a despreading timing, timing $t_{i,j,k}$ (where k=1 to N, k≠j) that gives the despreading value having a correlation with the interference from the $j^{th}$ (j=1 to N, j≠i) path which is within the despreading value of the $i^{th}$ path from this reception timing $t_i$ and synthesizing the despreading signals.

Patent Document 1: Japanese Laid-Open Patent Publication No. 2003-133999

Patent Document 2: Japanese Laid-Open Patent Publication No. 2005-354459

Patent Document 3: Japanese Laid-Open Patent Publication No. 2005-94134

Patent Document 4: International Patent Publication No. WO2004/025860

Non-Patent Document 1: A. Klein, "Data Detection Algorithms Specially Designed for the Downlink of Mobile Radio Systems", Proc. of IEEE VTC'97, PP. 203-207, Phoenix, May 1997

Non-Patent Document 2: 3GPP R4-040680, "HSDPA improvements for UE categories 7 and 8", Nokia, TSG RAN WG4#33, November 2004

Non-Patent Document 3: Hasegawa, Shimizu, "A Study on Sign Bit Chip Correlation MMSE Receiver with MICT," Proceedings of the IEICE General Conference, B-5-8, 2006

Although the channel estimation value at a timing without signal should be zero in theory, the above-described conventional techniques may provide a channel estimation value being the noise component even at a timing without signal since despreading is performed to determine the channel estimation value. As a result, the tap coefficient calculation accuracy by an equalizer may be deteriorated, which may degrade the reception characteristic.

Note that although each of the techniques described in the Patent References 1 to 4 adopt various ways to set despreading timing aiming at obtaining interference reduction effects, they fail to eliminate the timing of the noise component. In addition, the techniques cannot solve the above-identified problems because they determine channel estimation values in a conventional manner.

SUMMARY (1) According to an aspect of the embodiment, an apparatus includes a control apparatus for an equalizer that weighting-combines a received sequence using a weighted-combined coefficient obtained based on channel estimation values of each path timing of signals incoming from a plurality of paths and correlation values between each path, the control apparatus including:

(a) channel estimation unit that determines respective channel estimation values of the each path timing; and (b) channel estimation value control unit that detects a path timing, the channel estimation value of which is to be set to zero, based on a reception power of the path timing and a predetermined power threshold and sets a channel estimation value of the detected path timing to zero.

(2) According to an aspect of the embodiment, an apparatus includes a wireless terminal including the control apparatuses mentioned above.

(3) According to an aspect of the embodiment, an apparatus includes a control method of an equalizer that weighting-combines a received sequence using a weighted-combined coefficient obtained based on channel estimation values of each path timing of signals incoming from a plurality of paths and correlation values between each path, the control method including:

(a) a channel estimation step that determines respective channel estimation values of the each path timing; and (b) a control channel estimation value control step that detects a path timing, the channel estimation value of which is to be set to zero, based on a reception power of the path timing and a predetermined power threshold and sets a channel estimation value of the detected path timing to zero.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Hereinafter, embodiments will be described with reference to the drawings. Note that the embodiments described below are described by way of example only for ease of understanding of the concept of the embodiments, and various modifications and technical applications that are not provided explicitly in the following embodiments are not intended to be excluded. That is, the embodiments be practiced in various ways (such as combining embodiments) without departing from the spirit thereof.

(1) Description of One Embodiment

Figure 1:
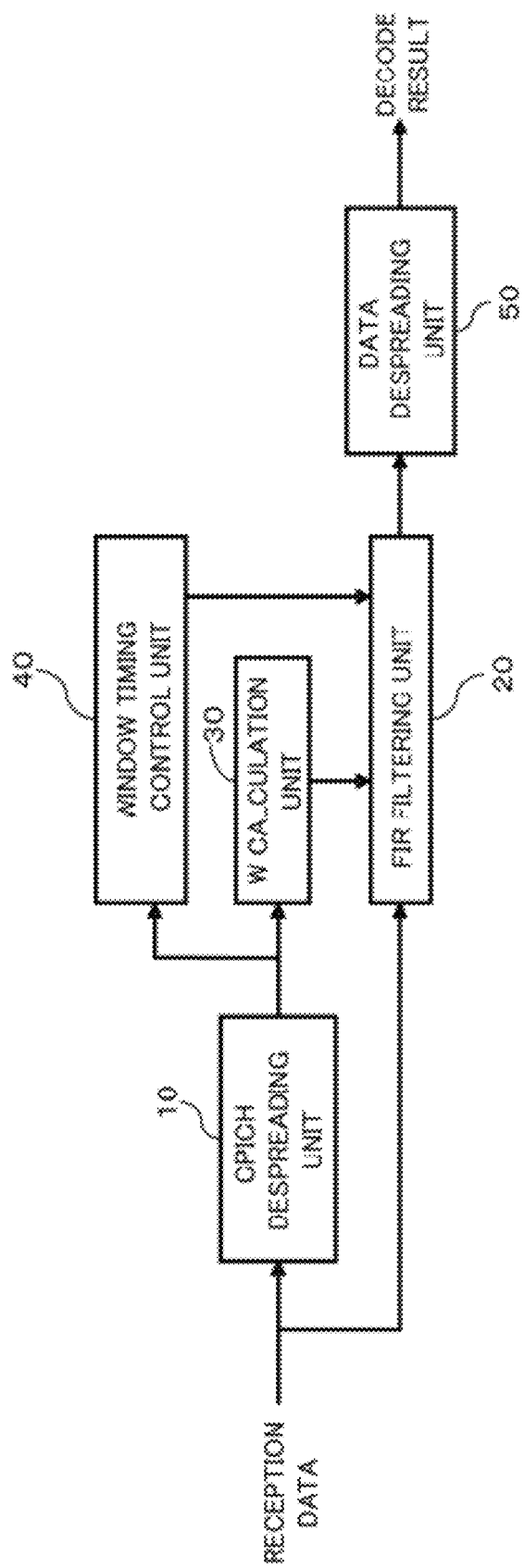
FIG. 1 is a block diagram illustrating a configuration of the main portion of a wireless receiver according to one embodiment.

FIG. 1 is a block diagram illustrating a configuration of the main portion of the wireless receiver according to one embodiment. The wireless receiver depicted in FIG. 1 is configured to include a common pilot channel (CPICH) despreading unit 10, an equalizer (FIR filtering unit) 20, a weight (tap coefficient) calculation unit 30, a window timing control unit 40, and a data despreading unit 50. Note that this wireless receiver can be applied as a reception system of a wireless terminal, such as a wireless telephone, for example.

Here, the CPICH despreading unit (channel estimation means) 10 may detect each path timing of CPICH signals (multipath signals) incoming from multiple paths based on the calculation result of the correlation between reception data and a predetermined spreading code replica, and determine a channel estimation value for each path timing by carrying out despreading processing on the reception data at the detected path timing. Note that "reception data" refers to digital baseband signal data that is subjected to amplification by a low-noise amplifier, frequency conversion (down convert), quadrature detection, AD conversion, bandwidth limiting, or the like after receiving the data at the antenna.

The FIR filtering unit (equalizer) 20 is adapted to equalize the reception data for the purpose of reducing the multipath interference (equalizing).

Figure 2:
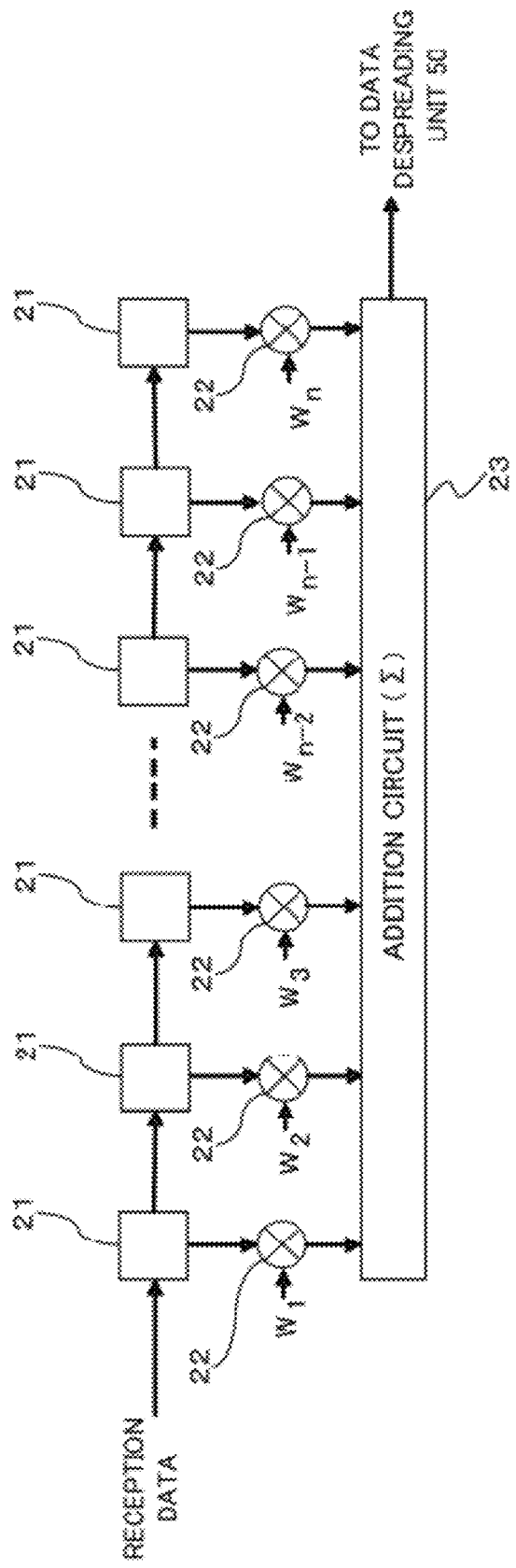
FIG. 2 is a block diagram illustrating a configuration of an FIR filter unit depicted in FIG. 1.

For this purpose, as depicted in FIG. 2, for example, the FIR filtering unit 20 is configured to include n delay circuits 21 (where n is an integer equal to or greater than 2) that delay input reception data (received sequence at the data channel) incrementally by an unit time (one chip), and n tap multipliers 22 that multiply the outputs from the delay circuits 21 by tap coefficients $w_1, w_2, \ldots, w_n$, and an addition circuit ($\Sigma$) 23 that adds (determines the total sum of) the outputs from the tap multipliers 22.

The window timing control unit 40 is adapted to control the number of tap coefficients w (the window timing for determining the window width) for the filtering at the FIR filtering unit 20. The data despreading unit 50 is adapted to despread the output of the FIR filtering unit 20 to obtain a demodulation result.

Figure 3:
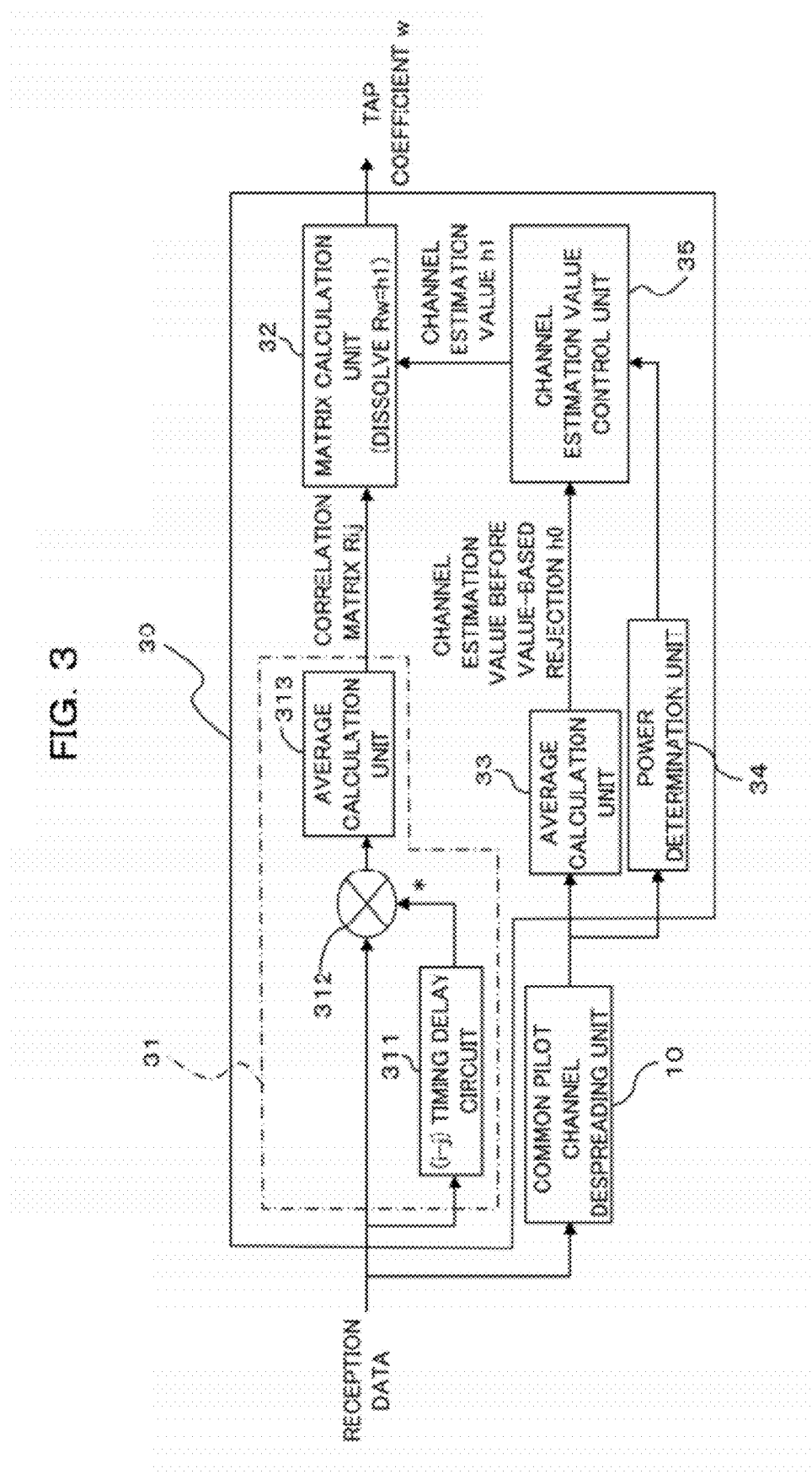
FIG. 3 is a block diagram illustrating a configuration of a weight (W) calculation unit depicted in FIG. 1.

The weight calculation unit 30 functions as a control apparatus for the equalizer 20 in cooperation with the CPICH despreading unit 10, and includes a function to calculate the tap coefficients w used in the FIR filtering unit 20 (provided to the tap multipliers 22) based on the reception data and the despreading result by the CPICH despreading unit 30. In this example, the weight calculation unit 30 is configured to include, as depicted in FIG. 3, for example, a correlation matrix calculation block 31 (a timing delay circuit 311, a complex multiplier 312, and an averaging unit 313), a matrix calculation unit 32, an averaging unit 33, a power determination unit 34, and a channel estimation value control unit 35.

Here, the correlation matrix calculation block 31 that is formed by the timing delay circuit 311, the complex multiplier 312, and the averaging unit 313 is adapted to determine the chip-level correlation matrix R (correlation values between each of the paths) expressed by Eq. (1.2). The timing delay circuit 311 and the complex multiplier 312 multiply one of the reception data (signal $d_{i+k}, d_{j+k}$) at the path timing that is shifted by (i−j) samples as a conjugate complex number by the other of $d_{i+k}, d_{j+k}$ before the despreading, and the averaging unit 313 cumulatively adds (averages) the multiplication results for each path, thereby determining the correlation matrix $R_{i,j}$ of i rows by j columns which has i×j correlation values as matrix elements. In other words, the correlation matrix calculation block 31 in this example functions as correlation calculation means that determines the correlation matrix R by averaging the product of the received sequence d prior to the despreading processing.

In addition, the averaging unit 33 is adapted to average the despreading results of the CPICH signals (channel estimation values) at the CPICH despreading unit 10. The power determination unit 34 is adapted to determine the power from the despreading result and determine a reception power at each path timing, which is referred to as a path power profile (or delay profile).

The channel estimation value control unit 35 is adapted to control (correct) a channel estimation value (average) that is determined through the CPICH despreading unit 10 and the averaging unit 33 based on the path power profile obtained at the power determination unit 34 and a predetermined power threshold, and is used to determine the tap coefficients w at the matrix calculation unit 32. For example, the path power profile obtained at the power determination unit 34 is compared against the power threshold, path timing of a power value exceeding the power threshold (the target path timing at which the channel estimation value should be set to zero) is identified (detected), the channel estimation value obtained within a predetermined timing range (timing threshold) including the path timing is selected as an valid channel estimation value, and channel estimation values obtained at other timings are replaced with zero as channel estimation values of the paths of the noise (interference) component.

The matrix calculation unit 32 is adapted to determine the tap coefficients w by resolving Eq. (1.1) using the correlation matrix R obtained at the correlation matrix calculation block 31 and the channel estimation value controlled at the channel estimation value control unit 35 (that is, obtain the product of an inverse matrix $R^{-1}$ of the correlation matrix R and the channel estimation value h).

In the wireless receiver in this embodiment as configured above, the reception data is input to the CPICH despreading unit 10, and the CPICH signal is despreaded, thereby the channel estimation value h0 is determined, which is input to the weight calculation unit 30.

In the weight calculation unit 30, the correlation matrix R is determined by averaging the product of reception data prior to despreading at the correlation matrix calculation block 31 (the timing delay circuit 311, the complex multiplier 312, and the averaging unit 313), and the average of the channel estimation value h0 and path power profile is determined by the averaging unit 33 and the power determination unit 34, respectively.

The average and the path power profile are input to the channel estimation value control unit 35. In the channel estimation value control unit 35, the target path timing, the channel estimation value of which is to be set to zero (the path timing corresponding to the noise component) is detected (identified) by a comparison between the path power profile and the power threshold, for example, thereby controlling the channel estimation value of this path timing to be zero.

Figure 4:
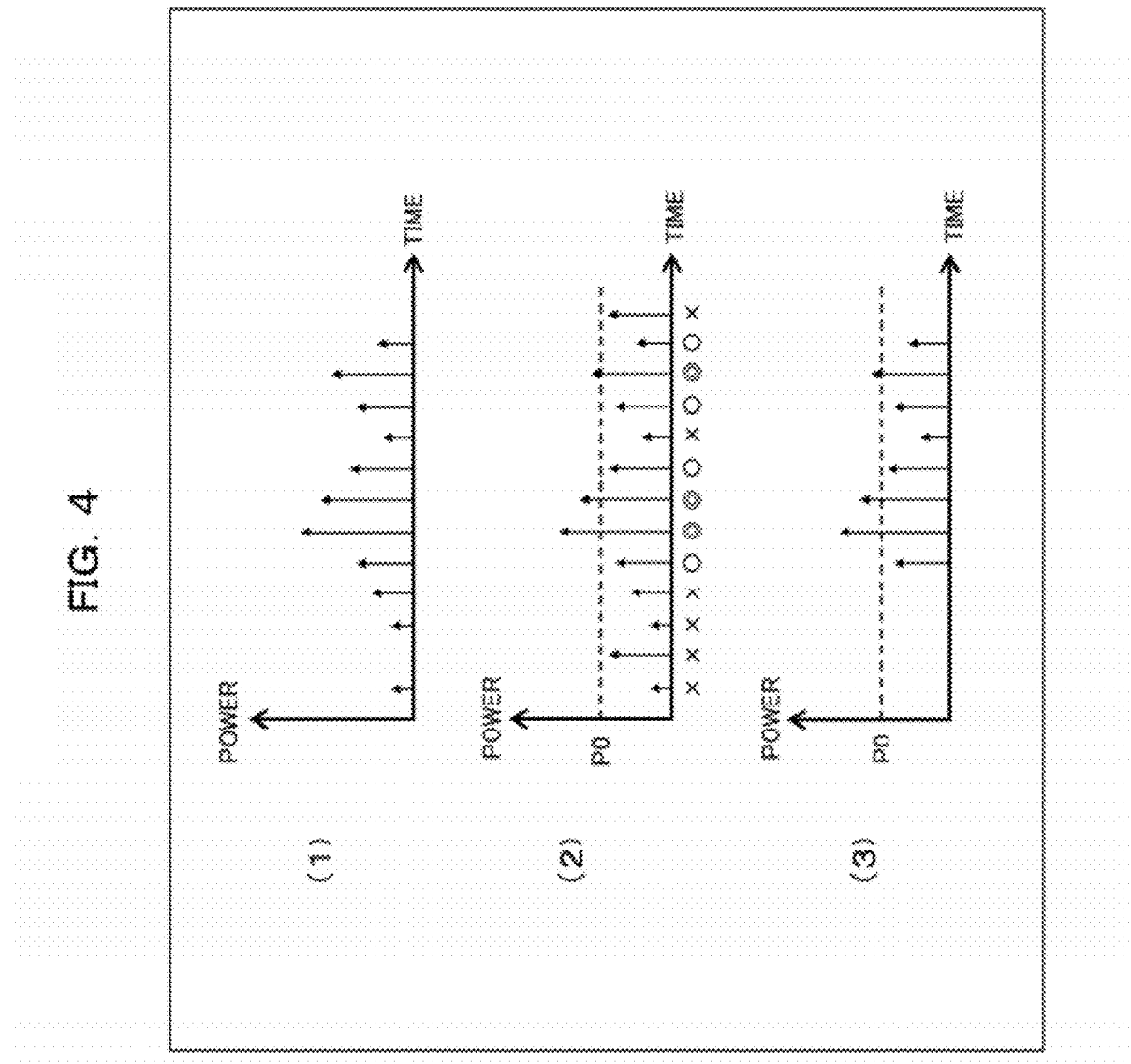
FIG. 4 is a schematic diagram illustrating operations of a channel estimation value control unit in the weight calculation unit depicted in FIG. 3 (channel estimation value-based rejection processing)

Suppose that the above path power profile is presently in the profile depicted in FIG. 4 (1), for example. In this case, as depicted in FIG. 4 (2), the channel estimation value control unit 35 compares the power value and power threshold P0 for each path timing in the path power profile, identifies three path timings exceeding the power threshold P0 (see the symbols "⊙") and four path timings within the range of ±N samples with respect to each of the path timings (where N is an natural number, and N=1 in this example, for example) (see the symbols "○") as valid path timings, and determines each channel estimation value h0 at the valid path timings as a valid channel estimation values. Then, as depicted in FIG. 4 (3), other path timings (see the symbols "x") are identified as path timings of the noise components, and the channel estimation value h0 of these path timings are replaced with zero (subjected to the value-based rejection process). Note that power threshold P0 may be determined by multiplying the maximum power value of a path by a constant (for example, 0.1), for example.

Each channel estimation value h1 after replacing the channel estimation values h0 at path timings that are identified as noise components with zero is input to the matrix calculation unit 32. In the matrix calculation unit 32, the tap coefficients w are determined by resolving Eq. (1.1) using the channel estimation values h1 after such value-based rejection processing and the correlation matrix R determined from the reception data prior to despreading processing by the correlation matrix calculation block 31, and are output to the tap multipliers 22 in the FIR filtering unit 20.

As described above, in this embodiment, in an apparatus that receives reception data at continuous timings by synthesizing the product of the inverse matrix $R^{-1}$ of the chip-level correlation matrix R and channel estimation values as tap coefficients w, after a channel estimation value h0 for each path timing is determined by despreading of a received CPICH signal, path timings exceeding a power threshold P0 are identified as valid path timings, path timings outside the range of ±N samples (timing threshold) with respect to the path timings exceeding a power threshold P0 are identified as path timings of noise components (the target the channel estimation values of which are set to be zero), and the channel estimation values h0 of the invalid path timings are replaced with zero (subjected to value-based rejection processing).

Accordingly, it is possible to prevent channel estimation values of path timings corresponding to noise components from being used in a calculation of the tap coefficients as valid channel estimation values, thereby enhancing the accuracy of the calculation of the tap coefficients w. As a result, the reception characteristic can be improved.

Figure 5:
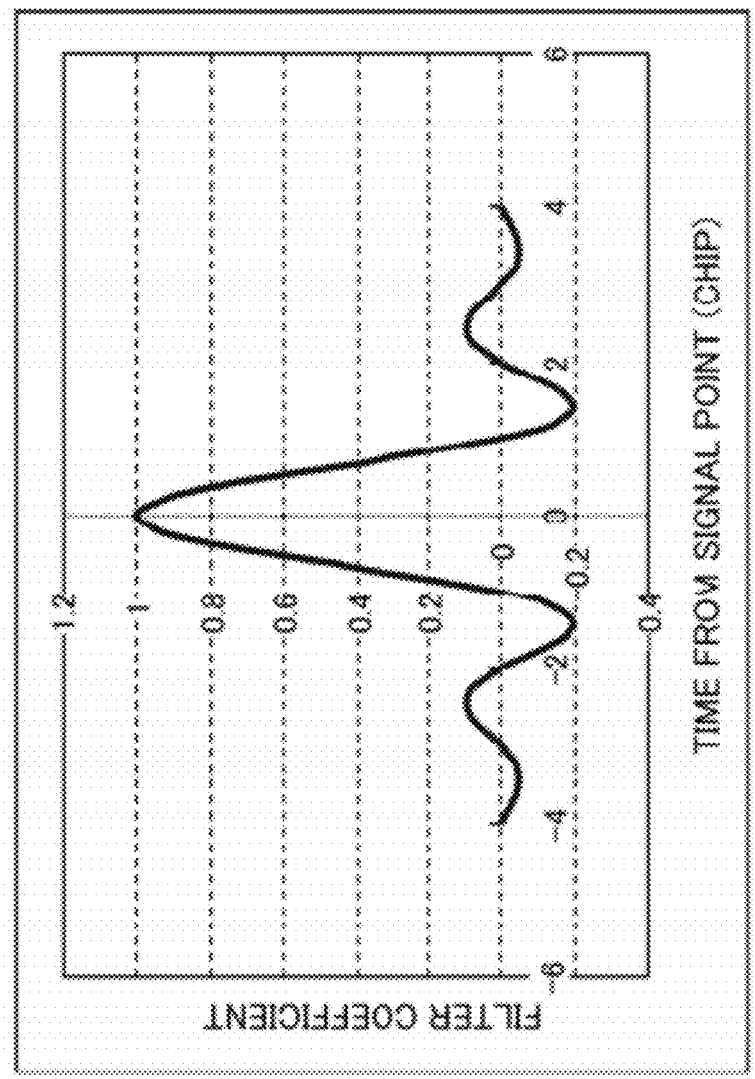
FIG. 5 is a graph illustrating filter coefficients versus chip times to supplement the description of the value-based rejection processing depicted in FIG. 4.

Note that although it may be possible to simply replace the channel estimation values h0 of path timings other than path timings exceeding the power threshold P0 with zero, reception signal waveforms in the proximity of a signal point have a strong tendency to have a waveform as depicted in FIG. 5, for example, and it is highly possible that valid values are obtained at timings in the proximity of the signal point. For this reason, the accuracy of the calculation of the tap coefficient can be enhanced, thereby improving the reception characteristic when keeping timings within ±N samples as valid path timings, as described above.

Figure 6:
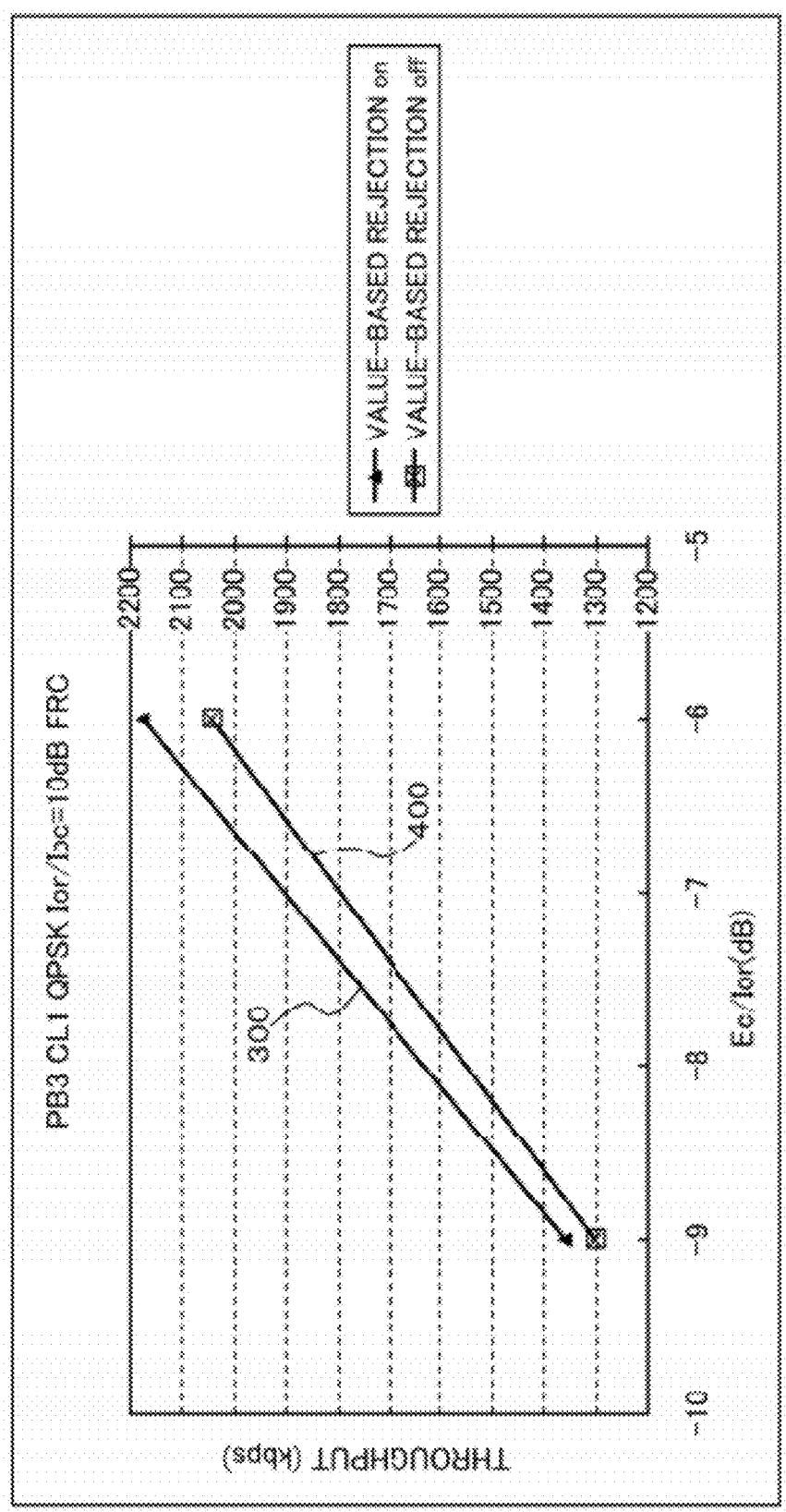
FIG. 6 is a graph illustrating the effects of the value-based rejection processing depicted in FIG. 4.

FIG. 6 illustrates simulation results of this example. The horizontal axis represents the ratio of the power (Ec) of data channels to the total transmission power (Ior) and the vertical axis represents the reception throughput (kbps) in FIG. 6. In addition, the simulation conditions are as follows: the closed loop mode 1 of the transmission diversity, the modulation scheme of the Fixed Reference Channel (FRC) is QPSK, total power (Ior)/noise power (Ioc)=10 dB, N=2, and P0 is 1/32 of the maximum path power.

In FIG. 6, reference numeral 300 denotes the reception characteristic when value-based rejection processing according to this example is carried out, and reference numeral 400 denotes the reception characteristic obtained by conventional techniques without the value-based rejection processing. It is shown that this example can improve the reception throughput characteristic by about 0.5 dB.

(2) Description of First Variant

Figure 7:
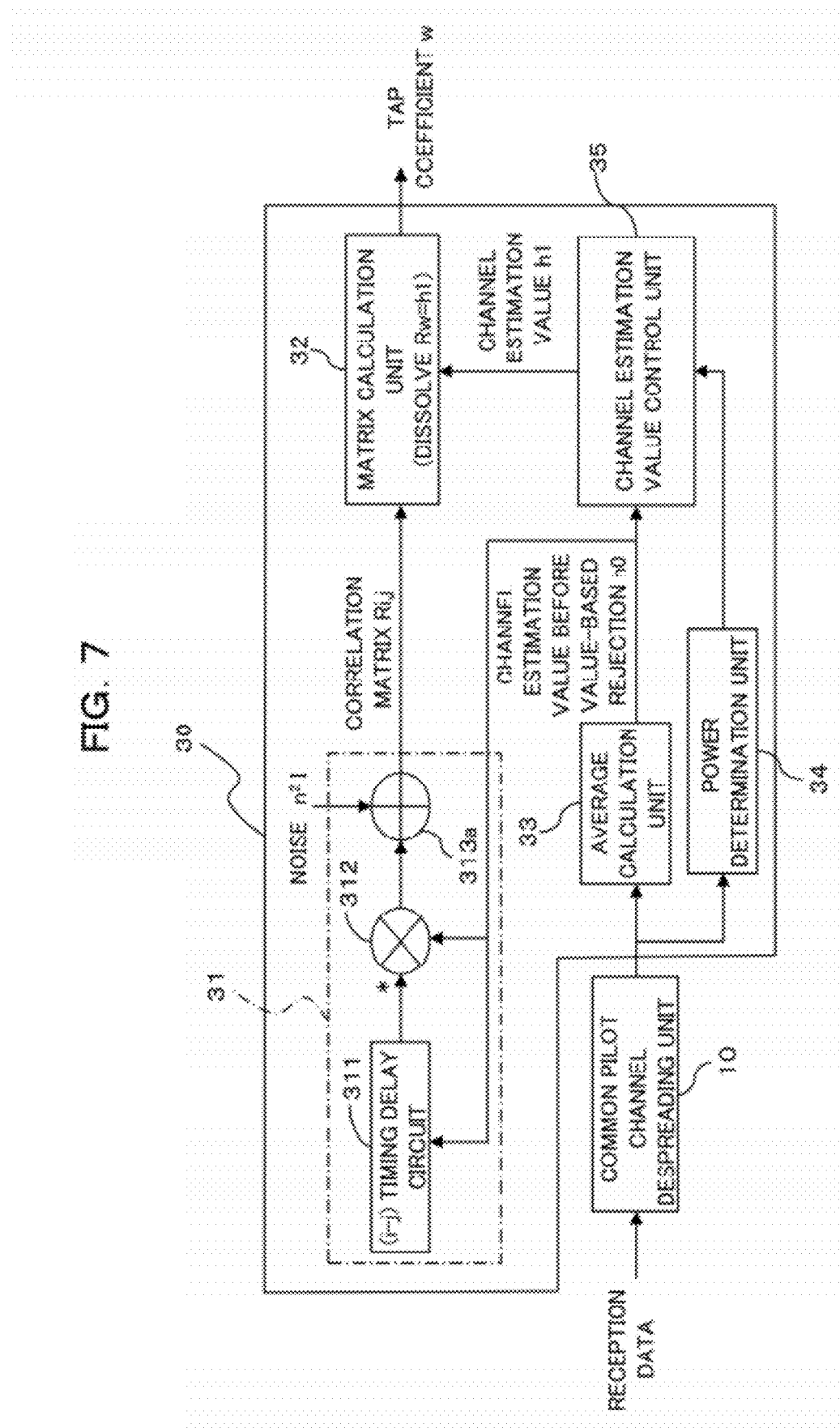
FIG. 7 is block diagram illustrating a first variation of the weight calculation unit depicted in FIG. 1.

FIG. 7 is block diagram illustrating a variation of the weight calculation unit 30 described above. The weight calculation unit 30 depicted in FIG. 7 is different from the configuration in depicted in FIG. 3 in that, in the correlation matrix calculation block 31, the weight calculation unit 30 is configured to determine the correlation matrix R based on channel estimation values h0 prior to the value-based rejection processing which is the average (output from the averaging unit 35) of the despreading results by the CPICH despreading unit 10 and a noise estimation value ($n^2I$), rather than determining the correlation matrix R from reception data prior to despreading.

That is, at the timing delay circuit 311 and the complex multiplier 312, for the output data from the averaging unit 33 (channel estimation values h0), one of channel estimation values h0 the timings of which are shifted each other by (i−j) samples is multiplied as a conjugate complex number by the other for all of path timings at which the channel estimation value h0 are determined. The results are cumulatively added at the adder 313a, as well as adding the noise estimation value ($n^2I$) to determine the correlation matrix R. This corresponds to carrying out the calculation expressed by the above-described Eq. (1.3) using a channel estimation value h0 prior to the value-based rejection processing.

That is, the correlation matrix calculation block 31 formed by the timing delay circuit 311, the complex multiplier 312, and the adder 313a in this example functions as correlation calculation means that determines the correlation matrix R based on the product of each channel estimation value h0 prior to the control by the channel estimation value control unit 37 (multiplying one of the channel estimation value h0 the timings of which are shifted each other by (i−j) samples as a conjugate complex number by the other) and the noise estimation value ($n^2I$).

Note that components having the same reference numerals as those in the above-described reference numerals are the same or similar elements unless otherwise stated.

Accordingly, also in this example in which the correlation matrix R is determined using channel estimation values h0 obtained by despreading processing CPICH signals, similar to the operations described above with reference to FIG. 4, the channel estimation value control unit 35 can prevent the channel estimation values at paths corresponding to noise components from being used in a calculation of the tap coefficients as valid channel estimation values by identifying timings exceeding the power threshold P0 in the path power profile as valid path timings and replacing the channel estimation value h0 at timings outside the range of ±N samples with respect to the path timings exceeding the power threshold P0 with zero (carrying out value-based rejection processing), thereby enhancing the accuracy of the calculation of the tap coefficients w. As a result, the reception characteristic can be improved.

(3) Description of Second Variant

Figure 8:
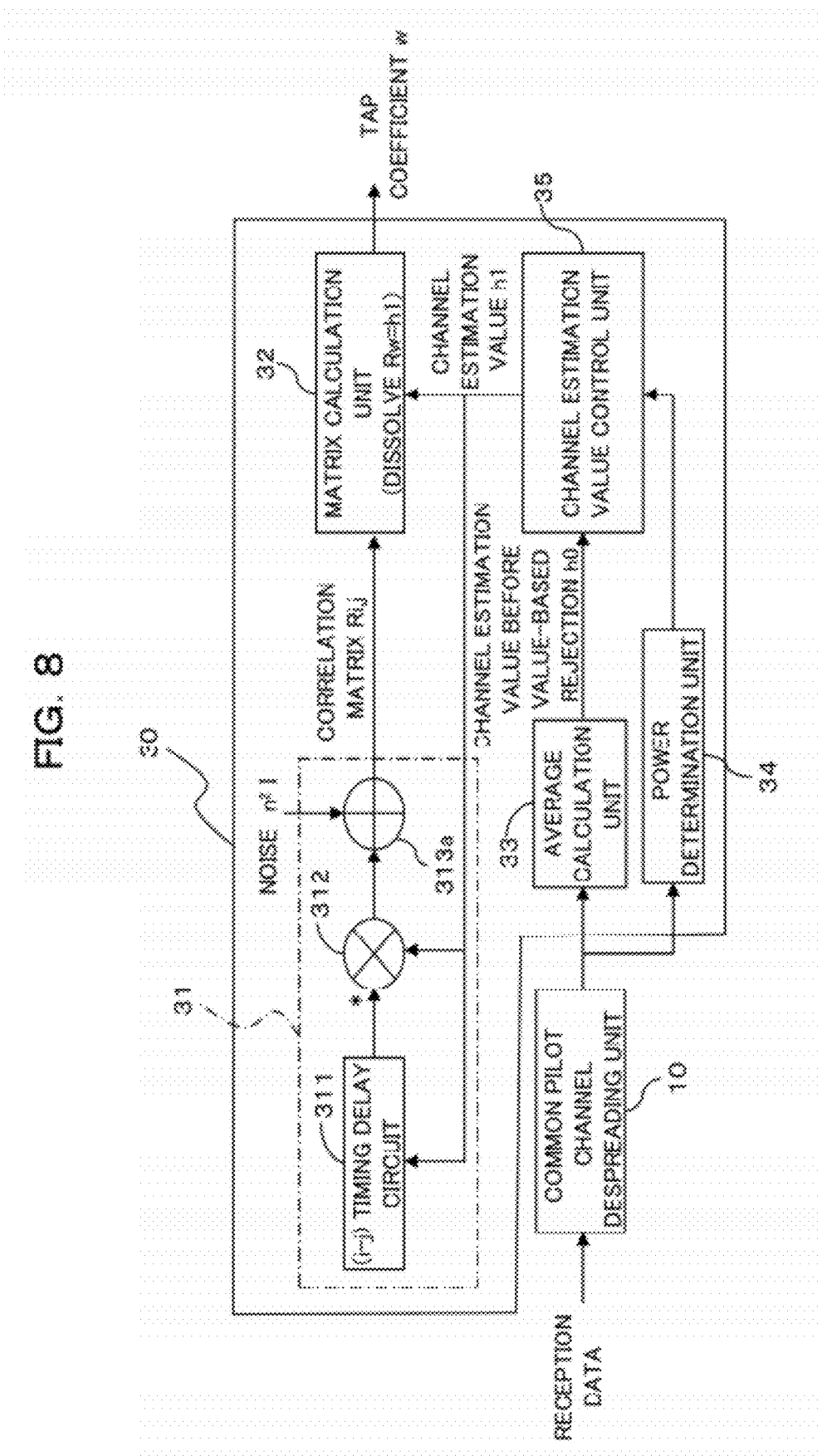
FIG. 8 is block diagram illustrating a second variation of the weight calculation unit depicted in FIG. 1.

FIG. 8 is block diagram illustrating a second variation of the weight calculation unit 30. The weight calculation unit 30 depicted in FIG. 8 is different from the configuration in depicted in FIG. 3 in that, in the correlation matrix calculation block 31, the channel estimation value h1 that are subjected to the value-based rejection processing at the channel estimation value control unit 35 are input to the timing delay circuit 311 and the complex multiplier 312, and that the correlation matrix R is determined based on the channel estimation values h1 after this value-based rejection processing and the noise estimation value ($n^2I$).

That is, the correlation matrix calculation block 31 (the timing delay circuit 311, the complex multiplier 312, and the adder 313a) in this example functions as correlation calculation means that determines the correlation matrix R based on the product of each channel estimation value h1 after the control by the channel estimation value control means 37 (after the value-based rejection processing) (multiplying one of the channel estimation value h1 the timings of which are shifted each other by (i−j) as a conjugate complex number by the other) and the noise estimation value ($n^2I$).

Note that components having the same reference numerals as those in the above-described reference numerals are the same or similar elements unless otherwise stated.

Accordingly, in addition to providing the effects similar to those of the above embodiment, the accuracy of the calculation of the correlation matrix R is further enhanced compared to the above-described embodiment and first variant since the channel estimation values of path timings corresponding to noise components are replaced with zero by the channel estimation value control unit 37 also for the channel estimation values used to determine the correlation matrix R, thereby the accuracy of the calculation of the tap coefficients can be further enhanced. As a result, the reception characteristic can be further improved.

(4) Description of Third Variant

Figure 9:
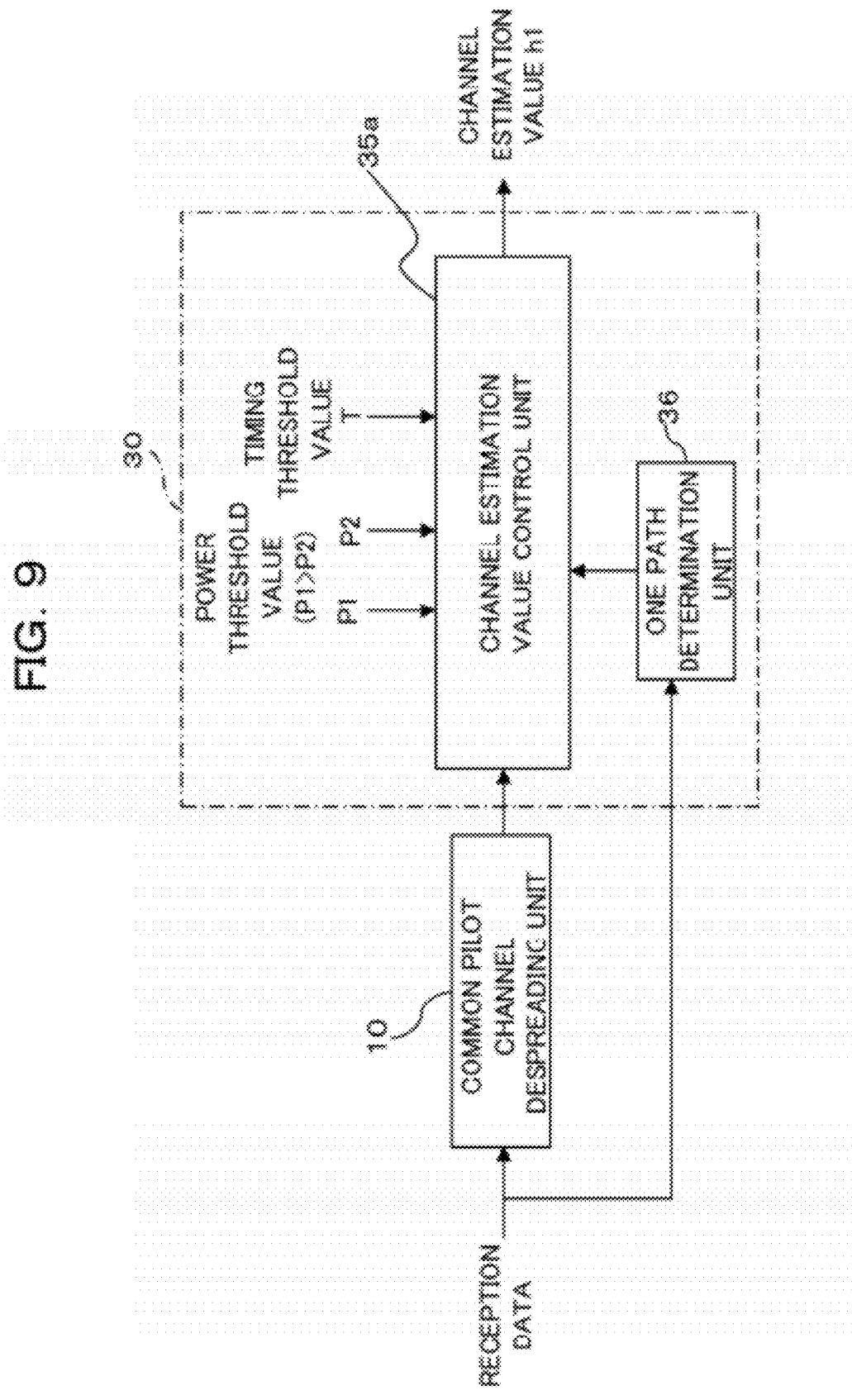
FIG. 9 is block diagram illustrating a third variation of the weight calculation unit depicted in FIG. 1.

FIG. 9 is block diagram illustrating a third variation of the weight calculation unit 30. The weight calculation unit 30 depicted in FIG. 9 is configured to include a channel estimation value control unit 35a, instead of the above-described channel estimation value control unit 35, and further include a one path determination unit 36. Note that the above-described correlation matrix calculation block 31 (the timing delay circuit 311, the complex multiplier 312, the averaging unit 313 (or the adder 313a)), the matrix calculation unit 32, the averaging unit 33, and the power determination unit 34 are omitted from the illustration.

Here, the one path determination unit 36 is adapted to include a function that determines whether or not the current propagation environment (reception status) is an one path environment (or close to a one path environment) (non-multipath environment), and is configured to be able to determine whether or not the current environment is an one path environment (or close to a one path environment) highly accurately based on information on the path power profile that are measured (averaged) for a time sufficiently longer than the phasing (the time unit for determining the channel estimation values) from the path search result, for example. Hereinafter, a one path environment or an environment close to the one path environment referred to as "one path environment", and the determination therefore is referred to as "one path determination."

Figure 10:
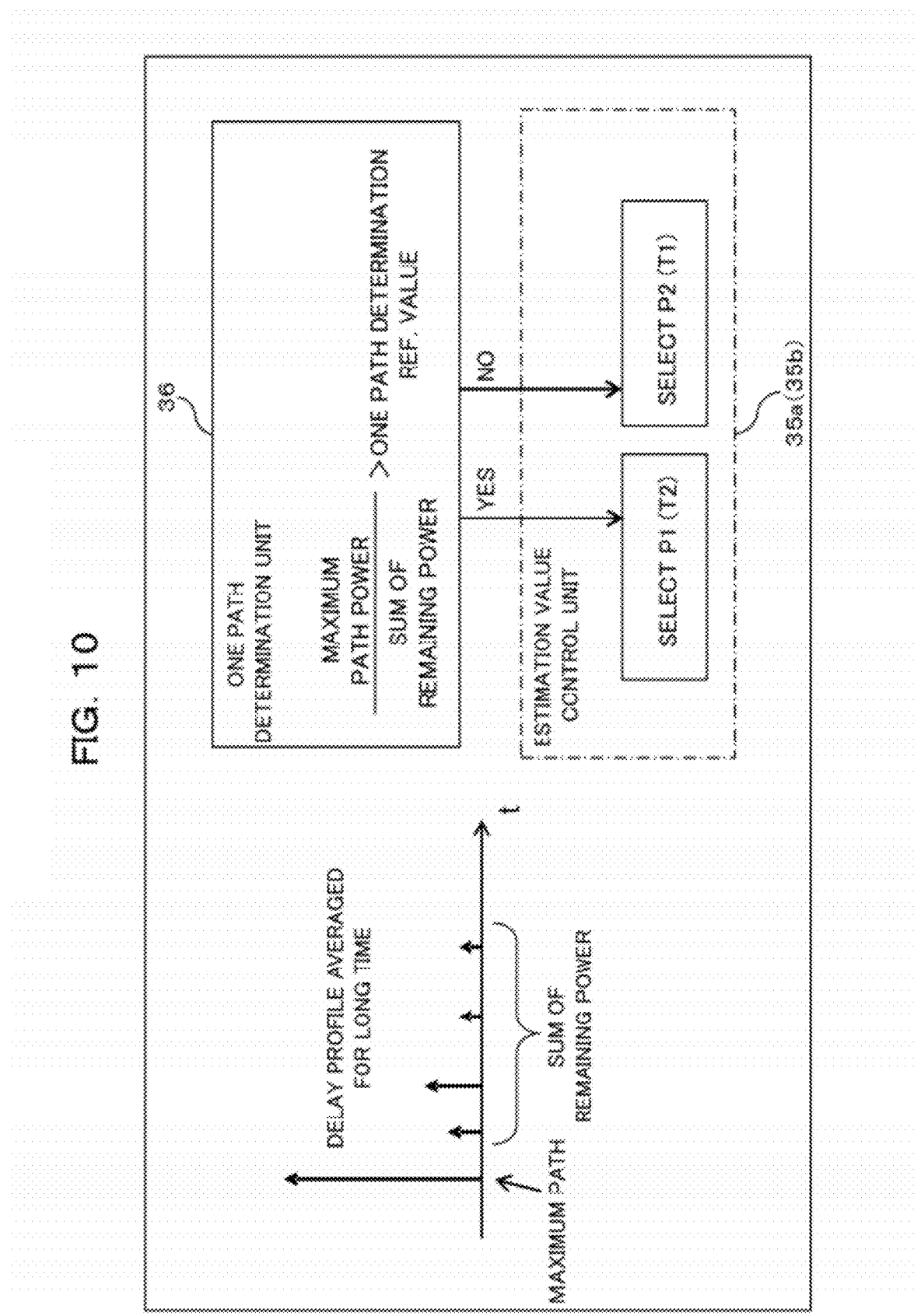
FIG. 10 is a schematic diagram illustrating operations of a channel estimation value control unit in the weight calculation unit depicted in FIG. 9 (channel estimation value-based rejection processing)

More specifically, as schematically depicted in FIG. 10, for example, it is determined that the current environment is a one path environment when the ratio of the maximum path power in the path power profile to the total of rest of the power exceeds a reference value (threshold). Note that the reference value can be set to four when considering a typical multipath environments and a one path environment.

The channel estimation value control unit 35a thus is adapted to control (correct) the channel estimation values determined the common pilot despreading unit 10 based on the determination result by the one path determination unit 36, the path power profile, two power thresholds P1 and P2 (P1>P2), and the timing threshold T. For example, as depicted in FIG. 10, the greater power threshold P1 is used and the channel estimation values smaller than the power threshold P1 is replaced with zero when the one path determination result indicates one path environment, whereas the smaller power threshold P2 is used and the channel estimation values smaller than the power threshold P2 is replaced with zero when a multipath environment is indicated.

Figure 11:
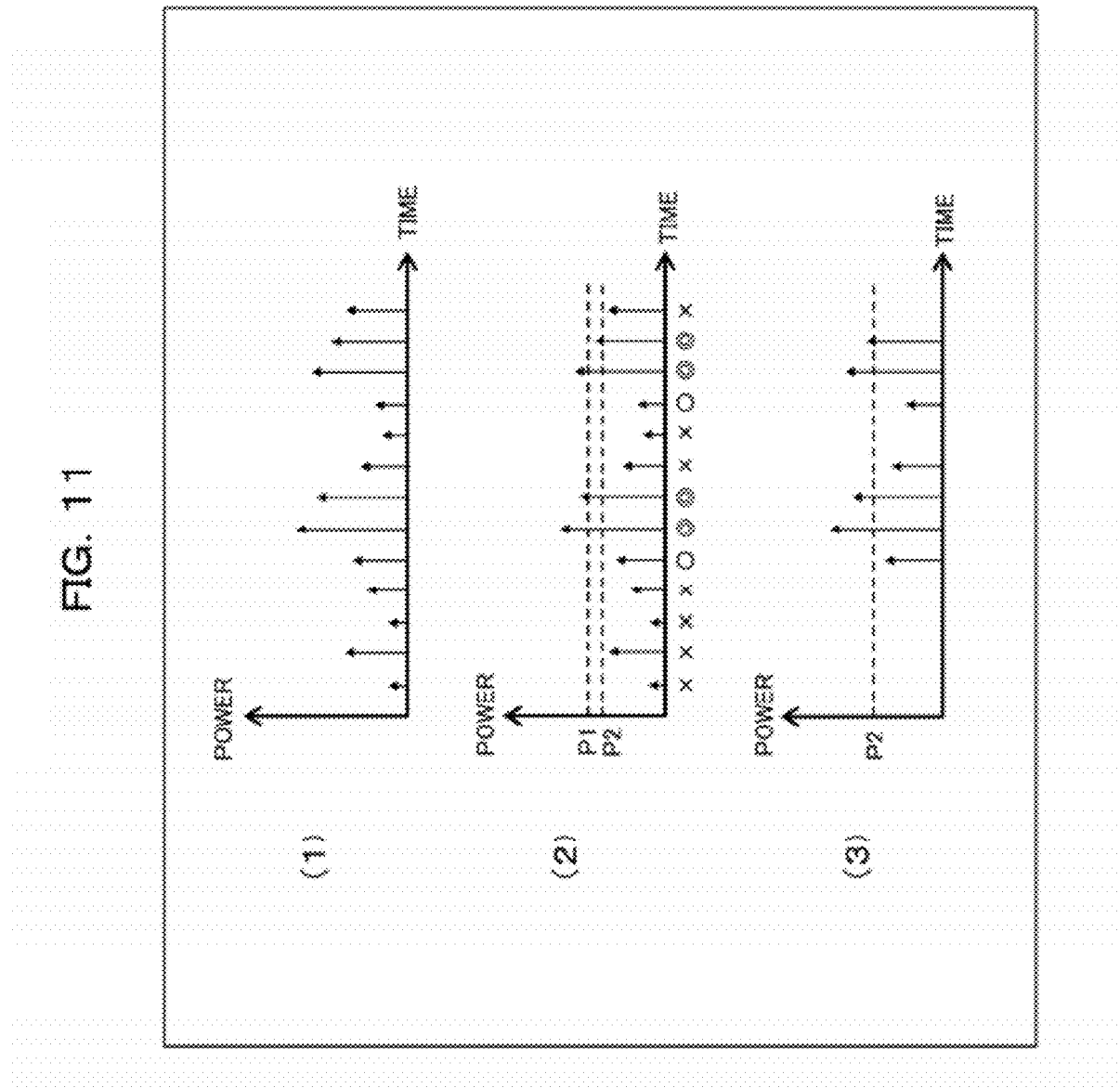
FIG. 11 is a schematic diagram illustrating operations of a channel estimation value control unit in the weight calculation unit depicted in FIG. 9 (channel estimation value-based rejection processing)

That is, assume that the path power profile of the despreading result of the common pilot signal is as depicted in FIG. 11 (1). When the determination result by the one path determination unit 36 indicates a multipath environment, as depicted in FIG. 11 (2), the channel estimation value control unit 35a compares the power value of each path timing in the path power profile with the smaller power threshold P2, identifies path timings exceeding this power threshold P2 (see the symbols "⊙") and path timings within the ranges of timing thresholds T=±N samples exceeding the power threshold P2 (N is a natural number, and N=1 in this example for example) with respect to respective path timings (see the symbols "○") as valid path timings, and determines channel estimation values h0 at the valid path timings as valid values. Then, as depicted in FIG. 11 (3), other path timings (see the symbols "x") are identified as path timings corresponding to the noise components, and the channel estimation value h0 of these path timings are replaced with zero.

Figure 12:
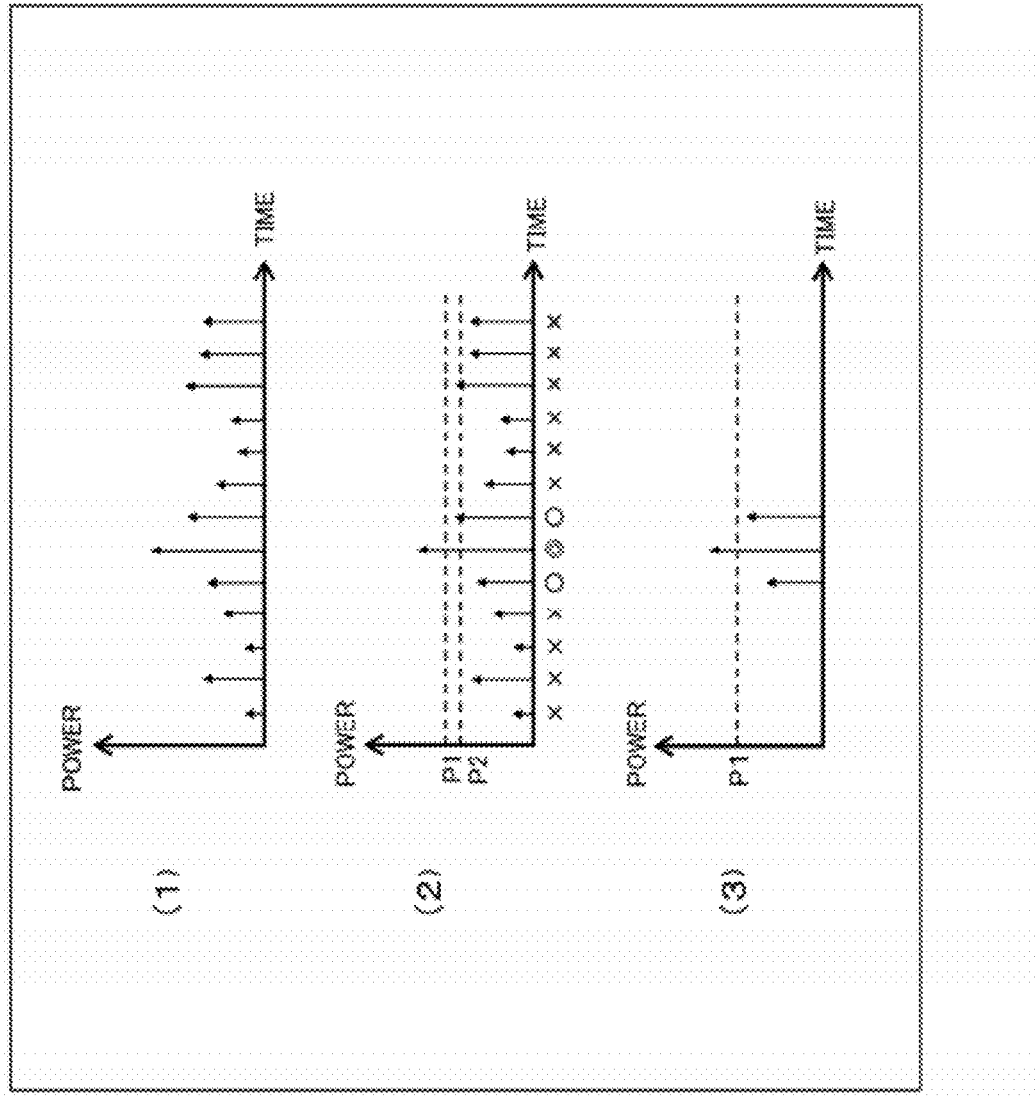
FIG. 12 is a schematic diagram illustrating operations of a channel estimation value control unit in the weight calculation unit depicted in FIG. 9 (channel estimation value-based rejection processing)

On the contrary, assume that the above path power profile is as depicted in FIG. 12 (1). When the determination result by the one path determination unit 36 indicates a one-path environment, as depicted in FIG. 12 (2), the channel estimation value control unit 35a compares the power value of each path timing in the path power profile with the greater power threshold P1, identifies path timings exceeding this power threshold P1 (see the symbols "⊙") and path timings within the ranges of T=±N samples with respect to respective path timings (see the symbols "○") as valid path timings, and determines channel estimation values h0 at the valid path timings as valid values. Then, as depicted in FIG. 12 (3), other path timings (see the symbols "x") are identified as path timings corresponding to the noise components, and the channel estimation value h0 of these path timings are replaced with zero.

That is, since the multipath interferences are smaller and the effects of eliminating the multipath interferences become less advantageous in a one path environment, the reception characteristic can be improved when the number of timings, the channel estimation values of which are replaced with zero, is increased. Accordingly, as depicted in FIG. 12, the reception characteristic can be improved by replacing greater channel estimation values with zero using the greater threshold P1. On the contrary, as depicted in FIG. 11, the number of timings, the channel estimation values of which are replaced with zero, is decreased using the smaller threshold P2 when the current environment is determined as a multipath environment, thereby enhancing the advantages of the effects of eliminating the multipath interferences to improve the reception characteristic.

(5) Description of Fourth Variant

Figure 13:
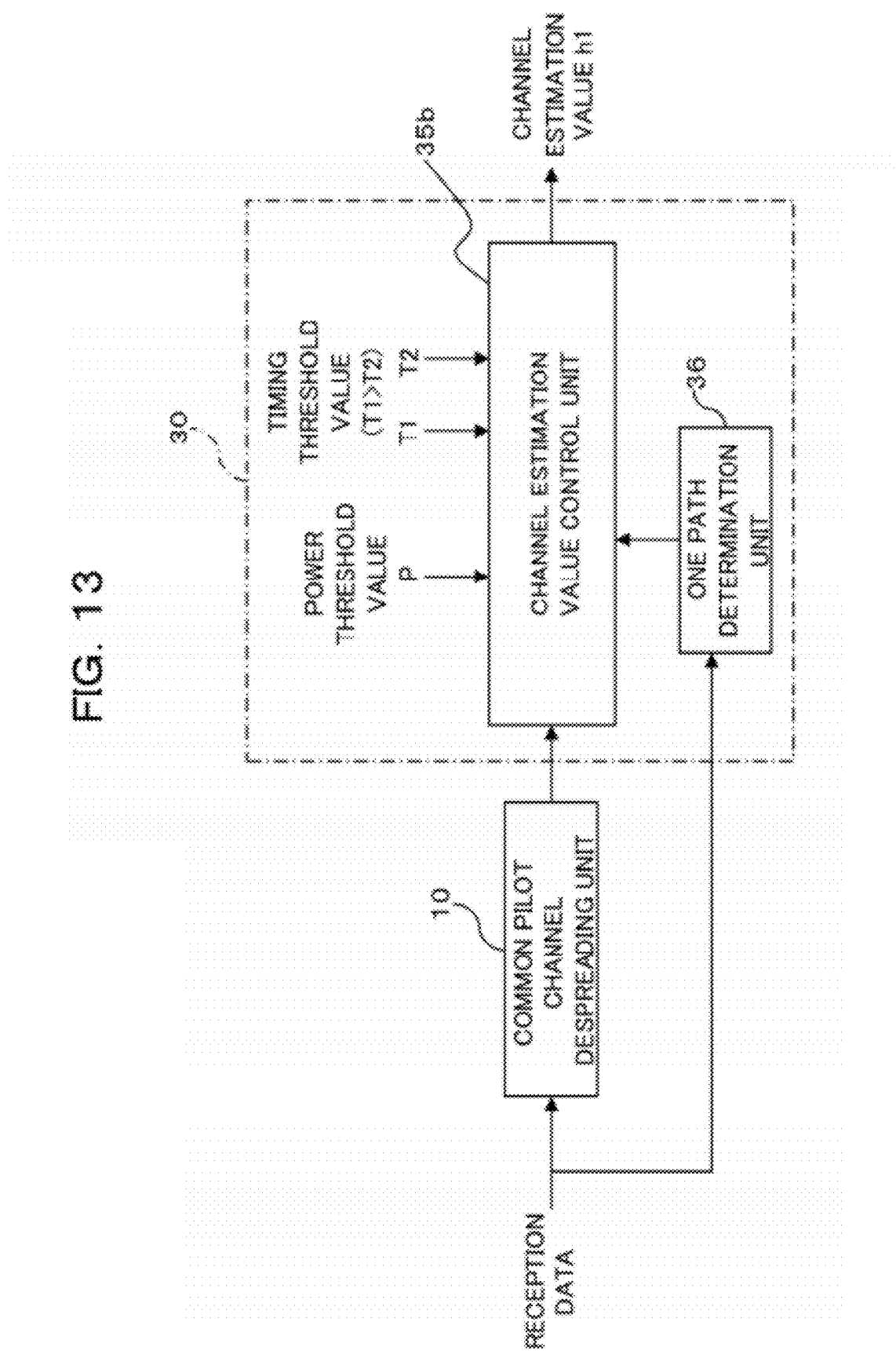
FIG. 13 is block diagram illustrating a fourth variation of the weight calculation unit depicted in FIG. 1.

FIG. 13 is block diagram illustrating a third variation of the weight calculation unit 30 described above. The weight calculation unit 30 depicted in FIG. 13 is configured to include a channel estimation value control unit 35b, instead of the above-described channel estimation value control unit 35, and further include a one path determination unit 36 that has been described with reference to the above third variant. Note that in FIG. 13, similar to FIG. 9, the above-described correlation matrix calculation block 31 (the timing delay circuit 311, the complex multiplier 312, the averaging unit 313 (or the adder 313a)), the matrix calculation unit 32, the averaging unit 33, and the power determination unit 34 are omitted from the illustration.

Here, the channel estimation value control unit 35b is adapted to control (correct) the channel estimation values h0 determined through the common pilot despreading unit 10 based on the determination result by the one path determination unit 36 that has been described above, the above-described path power profile, two power thresholds two timing thresholds T1 and T2 (T1 and T2 each represent a sample number, and T1>T2).

More specifically, as depicted in FIG. 10, the channel estimation value control unit 35b is adapted to replace the channel estimation values of path timings other than the path timings within the range of the smaller timing threshold ±T2 (for example, T2=1 and ±1 sample) with respect to path timings exceeding the power threshold P0 with zero using the timing threshold T2 when the one path determination result indicates one path environment. On the contrary, the channel estimation value control unit 35b is adapted to replace the channel estimation values of path timings other than the path timings within the range of the greater timing threshold ±T1 (for example, T1=2 and ±2 sample) with respect to path timings exceeding the power threshold P0 with zero using the timing threshold T1 when the one path determination result indicates a multipath environment.

Figure 14:
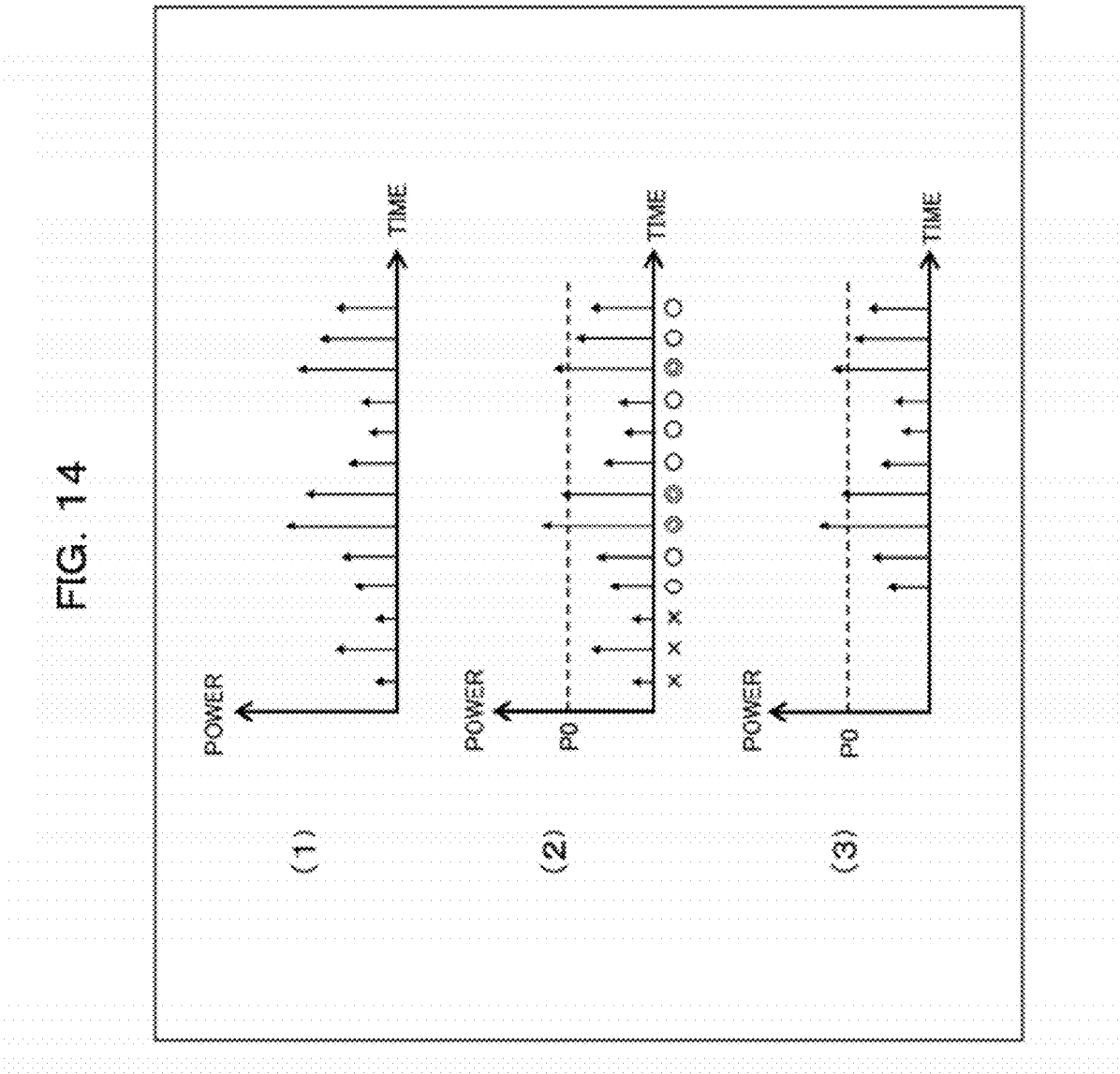
FIG. 14 is a schematic diagram illustrating operations of a channel estimation value control unit in the weight calculation unit depicted in FIG. 13 (channel estimation value-based rejection processing)

That is, assume that the path power profile of the despreading result of the common pilot signal is as depicted in FIG. 14 (1). When the determination result by the one path determination unit 36 indicates a one-path environment, as depicted in FIG. 14 (2), the channel estimation value control unit 35b compares the power value of each path timing in the power profile with the power threshold P0, identifies path timings exceeding this power threshold P0 (see the symbols "⊚") and path timings within the ranges of ±T1 (=2) samples with respect to respective path timings exceeding this power threshold P0 (see the symbols "○") as valid path timings, and determines channel estimation values h0 at the valid path timings as valid values. Then, as depicted in FIG. 14 (3), the channel estimation value h0 of other path timings (see the symbols "x") are replaced with zero.

Figure 15:
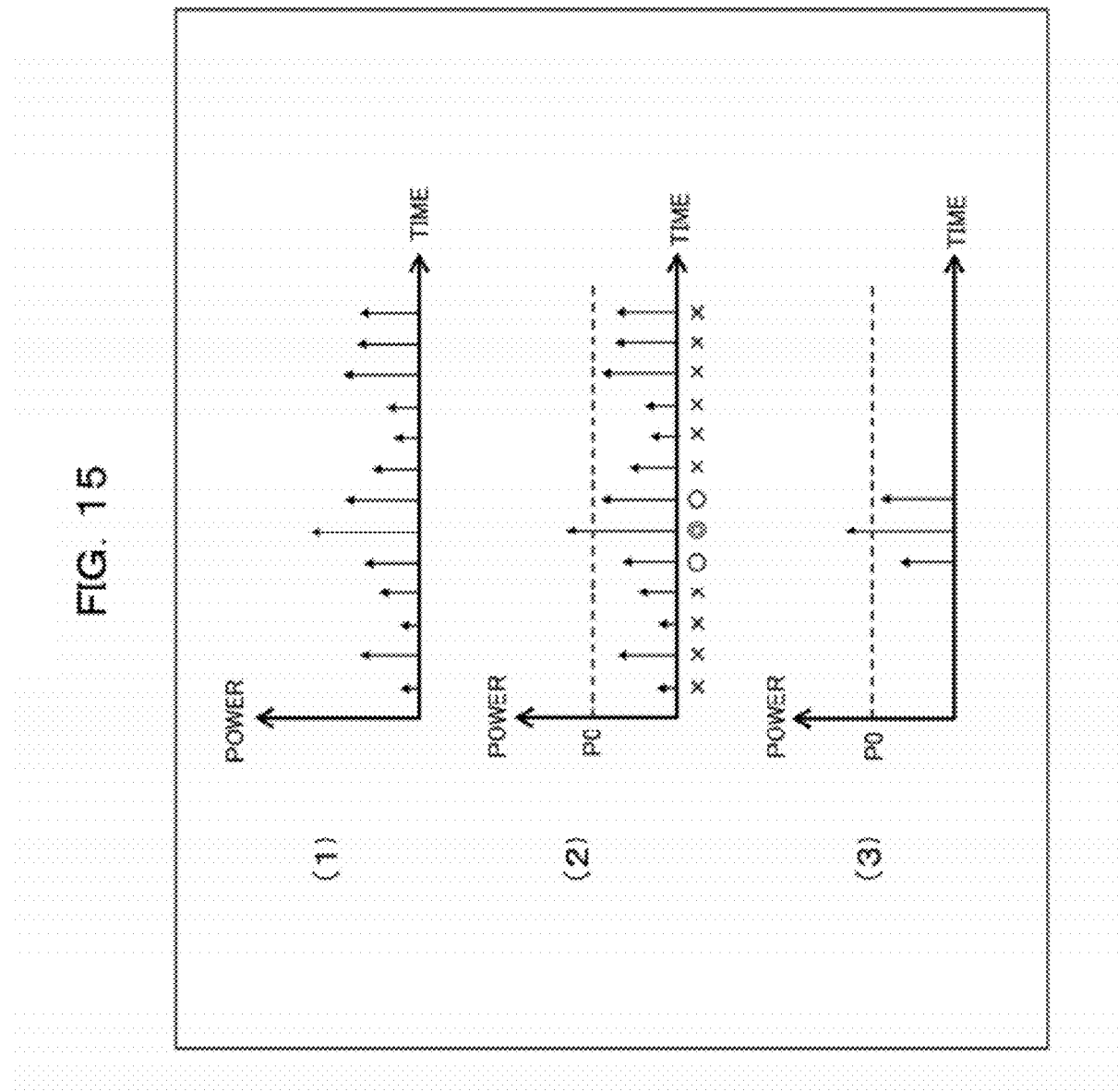
FIG. 15 is a schematic diagram illustrating operations of a channel estimation value control unit in the weight calculation unit depicted in FIG. 13 (channel estimation value-based rejection processing).

On the contrary, assume that the path power profile of the despreading result of the common pilot signal is as depicted in FIG. 15 (1). When the determination result by the one path determination unit 36 indicates a multipath environment, as depicted in FIG. 15 (2), the channel estimation value control unit 35b compares the power value of each path timing in the power profile with the power threshold P0, identifies path timings exceeding this power threshold P0 (see the symbols "⊚") and path timings within the ranges of ±T2 (=1) samples with respect to respective path timings exceeding this power threshold P0 (see the symbols "○") as valid path timings, and determines channel estimation values h0 at the valid path timings as valid values. Then, as depicted in FIG. 15 (3), other timings (see the symbols "x") are identified as the channel estimation values h0 of paths corresponding to the noise components, and are replaced with zero.

Accordingly, also in this variant, since the effects of eliminating the multipath interferences become less advantageous in an environment close to a one path environment, the reception characteristic can be improved when the number of timings, the channel estimation values of which are replaced with zero, is increased. Thus, as depicted in FIG. 15, the accuracy of the calculation of the tap coefficient can be enhanced to improve the reception characteristic by replacing more path timings of channel estimation values of are replaced with zero using the smaller timing threshold T2. On the contrary, when as depicted in FIG. 14, less timings are replaced with zero using the greater timing threshold T1 when the current environment is determined as a multipath environment, thereby enhancing the advantages of the effects of eliminating the multipath interferences to improve the reception characteristic.

That is, the above-described third and fourth variants are adapted to control (increase or decrease) the number of target path timings, the channel estimation values of which are to be set to zero (channel estimation values that are to be replaced with zero), in accordance with the determination whether the current environment is a one path environment or a multipath environment. Accordingly, one or both of the above-described power thresholds and timing thresholds may be controlled as long as the control described above is achieved The embodiments may provide at least one of effects or advantages listed below:

(1) It is possible to prevent the noise component from being determined as a channel estimation value. Accordingly, the accuracy of calculation of weighted-combined coefficients used in an equalizer can be enhanced, and thus the reception characteristic can be improved.

(2) It is expected that an improvement in the reception characteristic may be achieved by selecting all path timings other than path timings greater than the power threshold as the target path timings, the channel estimation values of which are to be set to zero. However, since it is highly probable that valid channel estimation values may be obtained at path timings near the path timings that are greater than the power threshold, it becomes possible to further improve the reception characteristic by setting the channel estimation values of the path timings greater than the power threshold and path timings within a predetermined timing threshold including the path timings greater than the power threshold as valid and setting the channel estimation values of other path timings to zero as path timings of the noise components.

(3) In addition, by determining the correlation values between each path used when determining the weighted-combined coefficients based on the power of each channel estimation value after the channel estimation values of the path timings of the noise components are controlled to zero, it is possible to further enhance the accuracy of the weighted-combined coefficients and thus the reception characteristic can be further improved.

(4) In addition, since the multipath interferences are smaller and the effects of eliminating the multipath interferences become less advantageous when the reception status of the received sequence is a non-multipath status, the reception characteristic can be improved by increasing the number of timings, the channel estimation values of which are to be set to zero, by increasing the power threshold (or reducing the timing threshold). On the contrary, when in a multipath status, the reception characteristic can be improved by decreasing the number of timings, the channel estimation values of which are to be set to zero, by reducing the power threshold (or increasing the timing threshold).

Note that it is one of other effects or advantages of the present invention to providing advantages and effects that can be obtained by best modes to implement the invention described below but cannot be obtained with conventional techniques.

As described above, according to the embodiments, since a target path timing, the channel estimation values of which is to be set to zero, is detected based on the reception power and the power threshold and the channel estimation values of such path timings are controlled to zero (value-based rejection processing is executed), it is possible to enhance the accuracy of the calculation of the tap coefficients in an equalizer, and as a result, the reception characteristic can be improved. Accordingly, the embodiment is considered as being quite useful in wireless communication techniques, especially, wireless communication techniques in which an equalizer that eliminates multipath interferences are applied.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment has been described in detail, it should be understood that the various changes, substitutions, and alterations could be made hereto without departing from the spirit and scope of the invention

What is claimed is

1. A control apparatus for an equalizer that weighting-combines a received sequence using a weighted-combined coefficient obtained based on channel estimation values of each path timing of signals incoming from a plurality of paths and correlation values between each path, the control apparatus comprising:
    a channel estimation unit that determines respective channel estimation values of the each path timing; and
    a channel estimation value control unit that detects a path timing, the channel estimation value of which is to be set to zero, based on a reception power of the path timing and a predetermined power threshold and sets a channel estimation value of the detected path timing to zero, wherein
    the channel estimation value control unit identifies a path timing other than the path timing having a power greater than the power threshold and the path timing within a predetermined timing threshold including the path timing having the power greater than the power threshold as a path timing, the channel estimation value of which is to be set to zero.

2. A control apparatus for an equalizer that weighting-combines a received sequence using a weighted-combined coefficient obtained based on channel estimation values of each path timing of signals incoming from a plurality of paths and correlation values between each path, the control apparatus comprising:
    a channel estimation unit that determines respective channel estimation values of the each path timing;
    a channel estimation value control unit that detects a path timing, the channel estimation value of which is to be set to zero, based on a reception power of the path timing and a predetermined power threshold and sets a channel estimation value of the detected path timing to zero; and
    a correlation calculation unit that determines the correlation value based on a product of the channel estimation values before control by the channel estimation value control unit and a noise estimation value.

3. A control apparatus for an equalizer that weighting-combines a received sequence using a weighted-combined coefficient obtained based on channel estimation values of each path timing of signals incoming from a plurality of paths and correlation values between each path, the control apparatus comprising:
    a channel estimation unit that determines respective channel estimation values of the each path timing;
    a channel estimation value control unit that detects a path timing, the channel estimation value of which is to be set to zero, based on a reception power of the path timing and a predetermined power threshold and sets a channel estimation value of the detected path timing to zero; and
    a correlation calculation unit that determines the correlation value based on a product of the channel estimation values after control by the channel estimation value control unit and a noise estimation value.

4. A control apparatus for an equalizer that weighting-combines a received sequence using a weighted-combined coefficient obtained based on channel estimation values of each path timing of signals incoming from a plurality of paths and correlation values between each path, the control apparatus comprising:
    a channel estimation unit that determines respective channel estimation values of the each path timing; and
    a channel estimation value control unit that detects a path timing, the channel estimation value of which is to be set to zero, based on a reception power of the path timing and a predetermined power threshold and sets a channel estimation value of the detected path timing to zero; and, wherein the channel estimation value control unit comprises a determination unit that determines whether or not a reception status of the received sequence indicates a non-multipath status based on a reception power of the each path timing, and wherein
    the channel estimation value control unit controls to increase the power threshold when it is determined that a non-multipath status is indicated by the determination unit, or to reduce the power threshold when it is determined that a multipath status is indicated by the determination unit.

5. The control apparatus for an equalizer according to claim 1, wherein
    the channel estimation value control unit comprises a determination unit that determines whether or not a reception status of the received sequence indicates a non-multipath status based on a reception power of the each path timing, and wherein
    the channel estimation value control unit controls to reduce the timing threshold when it is determined that a non-multipath status is indicated by the determination unit, or to increase the timing threshold when it is determined that a multipath status is indicated by the determination unit.

6. A wireless terminal comprising:
    a control apparatus for an equalizer that weighting-combines a received sequence using a weighted-combined coefficient obtained based on channel estimation values of each path timing of signals incoming from a plurality of paths and correlation values between each path, the control apparatus comprising:
        a channel estimation unit that determines respective channel estimation values of the each path timing; and
        a channel estimation value control unit that detects a path timing, the channel estimation value of which is to be set to zero, based on a reception power of the path timing and a predetermined power threshold and sets a channel estimation value of the detected path timing to zero, wherein the channel estimation value control unit identifies a path timing other than the path timing having a power greater than the power threshold and the path timing within a predetermined timing threshold including the path timing having the power greater than the power threshold as a path timing, the channel estimation value of which is to be set to zero.

7. A control method of an equalizer that weighting-combines a received sequence using a weighted-combined coefficient obtained based on channel estimation values of each path timing of signals incoming from a plurality of paths and correlation values between each path, the control method comprising:
   determining respective channel estimation values of the each path timing;
   detecting a path timing, the channel estimation value of which is to be set to zero, based on a reception power of the path timing and a predetermined power threshold;
   identifying a path timing other than the path timing having a power greater than the power threshold and the path timing within a predetermined timing threshold including the path timing having the power greater than the power threshold as a path timing, a channel estimation value of which is to be set to zero; and
   setting the channel estimation value of the detected path timing to zero.

8. A control method of an equalizer that weighting-combines a received sequence using a weighted-combined coefficient obtained based on channel estimation values of each path timing of signals incoming from a plurality of paths and correlation values between each path, the control method comprising:
   determining respective channel estimation values of the each path timing;
   detecting a path timing, the channel estimation value of which is to be set to zero, based on a reception power of the path timing and a predetermined power threshold;
   setting a channel estimation value of the detected path timing to zero; and
   determining the correlation value based on a product of the channel estimation values before the control and a noise estimation value.

9. A control method of an equalizer that weighting-combines a received sequence using a weighted-combined coefficient obtained based on channel estimation values of each path timing of signals incoming from a plurality of paths and correlation values between each path, the control method comprising:
   determining respective channel estimation values of the each path timing;
   detecting a path timing, the channel estimation value of which is to be set to zero, based on a reception power of the path timing and a predetermined power threshold;
   setting a channel estimation value of the detected path timing to zero; and
   determining the correlation value based on a product of the channel estimation values after the control and a noise estimation value.

10. A control method of an equalizer that weighting-combines a received sequence using a weighted-combined coefficient obtained based on channel estimation values of each path timing of signals incoming from a plurality of paths and correlation values between each path, the control method comprising:
    determining respective channel estimation values of the each path timing;
    detecting a path timing, the channel estimation value of which is to be set to zero, based on a reception power of the path timing and a predetermined power threshold;
    setting a channel estimation value of the detected path timing to zero;
    determining whether or not a reception status of the received sequence indicates a non-multipath status or not based on a reception power of the each path timing; and
    increasing the power threshold when it is determined that a non-multipath status is indicated, and reducing the power threshold when it is determined that a multipath status is indicated.

11. The control method of an equalizer according to claim 7, further comprising determining whether or not a reception status of the received sequence indicates a non-multipath status based on a reception power of the each path timing; and
    reducing the timing threshold when it is determined that a non-multipath status is indicated, and increasing the timing threshold is increased when it is determined that a multipath status is indicated.

12. A control apparatus for an equalizer that weighting-combines a received sequence using a weighted-combined coefficient obtained based on channel estimation values of each path timing of signals incoming from a plurality of paths and correlation values between each path, the control apparatus comprising:
    a channel estimation unit that determines respective channel estimation values of the each path timing;
    a channel estimation value control unit that detects a path timing other than the path timing having a power greater than a predetermined power threshold and the path timing within a predetermined timing threshold including the path timing having the power greater than the power threshold as a path timing, the channel estimation value of which is to be set to zero and sets a channel estimation value of the detected path timing to zero, wherein
    the channel estimation value control unit determines whether or not a reception status of the received sequence indicates a non-multipath status based on a reception power of the each path timing, and wherein
    the channel estimation value control unit controls the timing threshold according to the determined reception status.

* * * * *